Figure 1:
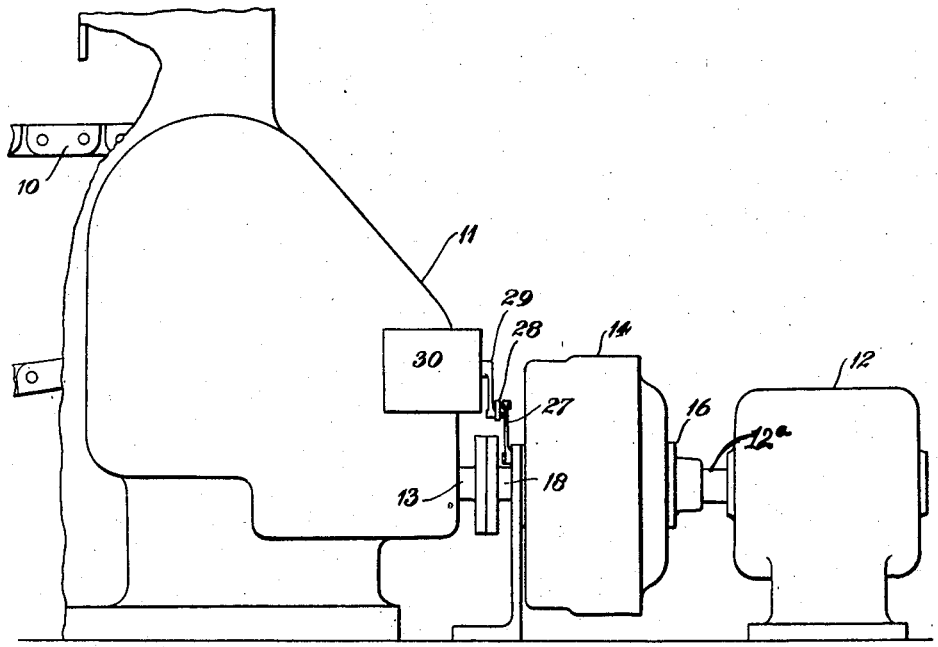

Aug. 26, 1941.   H. SINCLAIR ET AL   2,253,656
HYDRAULIC POWER-TRANSMISSION SYSTEM
Filed Dec. 23, 1938

Inventors
Harold Sinclair
and
Robert Grimsey Cooper
by
Dean Fairbank & Hirsch

Patented Aug. 26, 1941

2,253,656

UNITED STATES PATENT OFFICE 2,253,656

HYDRAULIC POWER-TRANSMISSION SYSTEM

Harold Sinclair, Kensington, London, and Robert Grimsey Cooper, Isleworth, England, assignors to Hydraulic Coupling Patents Limited, London, England, a company of Great Britain Application December 23, 1938, Serial No. 247,414
In Great Britain December 24, 1937

1 Claim. (Cl. 60—54)

This invention relates to power-transmission systems of the kind in which a driving machine is coupled to a driven machine, which is required to run at various speeds relative to the speed of the driving machine, by a hydraulic coupling of the kinetic type which is provided with means whereby, when the system is operating, the liquid content of the working circuit of the coupling can be varied so as to alter the slip in the coupling and consequently the speed ratio of the two machines.

The hydraulic couplings in present general use in such systems have the Vulcan form of working circuit with a continuous core guide ring around which the vortex circulation takes place; and the torque-slip characteristic curves of such couplings, plotted with torque as abscissa for various degrees of filling with constant impeller speed, radiate from the origin and (with the exception of those where the liquid content is at or near its normal maximum value, when the characteristic curve is nearly horizontal and the slip at normal torque is of the order of 3%) have in general a slope which increases with reduction in filling and increase in torque at torque values exceeding the normal torque as above defined. Thus, as the torque increases above the normal torque, under any constant degree of partial filling of the working circuit, a constant increment to the torque causes in general an increasing increment to the slip, although the slopes of the curves vary considerably over the working range between slip values of 20 and 66% and torque values from 80% of normal torque upwards.

Recently hydraulic couplings have come into use, in particular for driving centrifugal pumps and fans, which in general impose a load varying according to a fixed law with the speed at which they are driven, in which both parts of the core guide ring are interrupted, as described in Patent No. 2,139,107 of N. L. Alison issued December 6, 1938, with the object of obviating a flat-spot effect in the quantity-slip characteristic curve of the usual Vulcan coupling hereinabove referred to. The coupling with such an interrupted core guide ring, which is particularly suitable for such drives, has torque-slip characteristic curves which have a considerably steeper slope in the region between 80% and normal torque for partial degrees of filling between slip values of 20 and 66%. For example, one interrupted core coupling tested gave a torque-slip curve for 62% filling the slope of which to the torque axis was very steep up to twice the normal torque.

Where it is required to drive at various speeds a driven machine which imposes a load fluctuating independently of the speed, for example a mechanical stoker, or a conveyer, or a kiln, the use of a coupling having the Vulcan form of working circuit, while enabling the speed of the driven machine to be adjusted by varying the degree of filling of the circuit, allows substantial and objectionable fluctuations to occur in its speed in consequence of, and in general in inverse relation to, the above-mentioned fluctuations in the load.

Where a coupling having an interrupted core guide ring is used to drive such a fluctuating load, the resultant fluctuations in speed are much larger and more objectionable than those occurring when the Vulcan coupling with a continuous core guide ring is used.

An object of the present invention is to provide a power-transmission system of the kind set forth, in which such speed fluctuations are reduced and which is especially adapted for a driven machine imposing a load which varies indeterminately.

This invention resides in the discovery that the coupling characteristics can be widely influenced by varying the cross section of the core guide ring and that the object of the invention can be attained by suitably thickening this ring in a radial direction so that it extends nearer to the inner profile diameter of the working circuit.

According to this invention, therefore, in a power-transmission system of the kind hereinbefore set forth, wherein the driven machine imposes a load fluctuating independently of the speed, and wherein the hydraulic coupling has vaned impeller and runner elements together forming a toroidal working circuit containing a core guide ring around which the vortex circulation is adapted to take place, the cross-sectional area of the return junction between said elements is less than the cross-sectional area of the flow junction between said elements and the cross-sectional area of the circuit passages varies smoothly between said junctions, the arrangement being such that the torque-slip characteristic curves for various degrees of filling of the coupling, over a useful part of the ranges of torque and slip, are rendered flatter with reference to the torque axis than the curves of couplings now in use.

Figure 2:
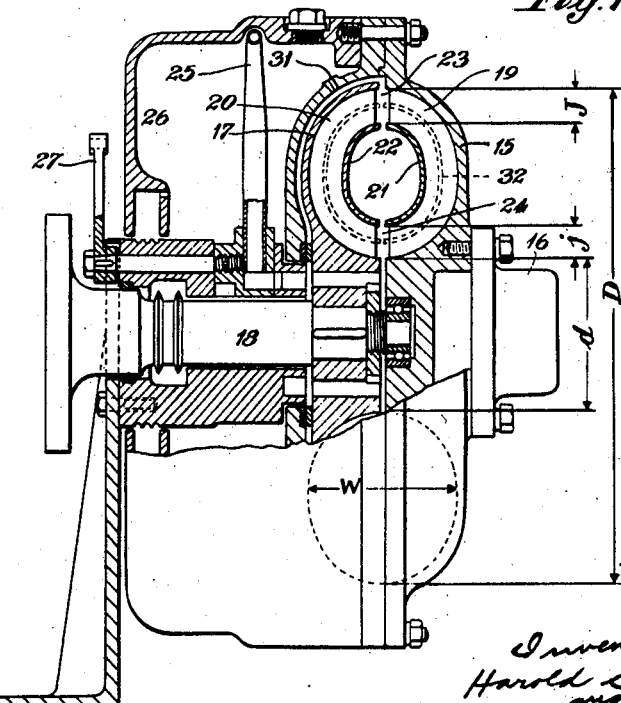

The invention will be further described by way of example with reference to the accompanying diagrammatic drawing, in which:

Fig. 1 is an elevation of the driving mechanism of a chain-grate stoker for a steam boiler, and Fig. 2 is a sectional elevation of the hydraulic coupling shown in Fig. 1.

Referring to Fig. 1, the stoker grate 10 is driven through gearing contained in a casing 11 by an alternating-current electric motor 12 having its shaft 12a coupled to the driving shaft 13 of the gearing by a hydraulic coupling 14.

This coupling (Fig. 2) includes an impeller element 15 fixed by a flanged shaft coupling 16 to the shaft 12a of the motor 12, and a runner element 17 fixed to a driven shaft 18 which in turn is fixed to the driving shaft 13 of the gearing. The impeller and runner elements are juxtaposed to form a toroidal working circuit of oval section and are provided respectively with radial vanes 19 and 20 and with core guide members 21 and 22 which are juxtaposed to form a ring. This ring extends nearer to the coupling axis than is customary, and is so shaped that the radial width of the flow junction 23 between the elements 15 and 17 is equal to the radial width of the return junction 24, these junctions being disposed in a common plane. Thus the cross-sectional area of the impeller passages increases smoothly from its inlet at 24 to its outlet at 23, and the cross-sectional area of the runner passages decreases smoothly from its inlet at 23 to its outlet at 24.

Control means for obtaining any desired degree of filling of the working circuit include an eccentrically mounted scoop tube 25 housed in a rotatable reservoir chamber 26 and capable of being rocked by a control lever 27 so as to displace the scooping mouth in part radially and thereby cause it to transfer more or less liquid from the reservoir chamber 26 to the working circuit whence liquid returns to the reservoir through restricted drain ports 31. This arrangement for varying the degree of filling of the working circuit is fully described in the patent of H. Sinclair and A. C. Basebe, No. 2,187,667, issued Jan. 16, 1940. The control lever 27 may be coupled by a link 28 (Fig. 1) to an actuating member 29 of a telemotor 30 of a boiler control system.

The working circuit of the coupling shown in Fig. 2 is proportioned as follows, the outer profile diameter (D) of the working circuit being taken as 100%:

| | Per cent. of D |
|---|---|
| Inner profile diameter (d) | 31 |
| Radial width of flow junction (J) | 7 |
| Radial width of return junction (j) | 7 |
| Maximum width of circuit (W) taken axially of the coupling | 30 |

A hydraulic coupling having radial vanes and an oval section working circuit in general similar to that shown in Fig. 2 and proportioned within the following limits:

| | Per cent. |
|---|---|
| D | 100 |
| d | 30–40 |
| J | 6– 7½ |
| j | 6– 7½ |
| W | 27–31 | operates in such a way that all its torque-slip characteristic curves, within at least the range of filling exceeding 50%, have a slope to the horizontal torque axis which, within the range of torque values between normal and twice normal torque and slip values not exceeding 66%, is less than its maximum slope at torque values less than 80% of the normal torque, and the curve is nearly parallel to the torque axis within said ranges.

If the construction illustrated in Fig. 2 has the outer profile diameter (D) 100, the inner profile diameter (d) 30, the radial width of the flow junction (J) 7.5 and the radial width of the return junction (j) 6, the ratio of return area to flow area will be 31%. If the outer profile diameter (D) be 100, the inner profile diameter (d) 40, the radial width of flow junction (J) 6 and the radial width of return junction (j) 7.5, the ratio of return area to flow area will be 63%.

The working circuit may be provided with guide rings of roughly semi-circular section disposed between the core ring and the boundary, as indicated by dotted lines 32 in Fig. 2.

The improved power-transmission system can therefore be operated over a substantially wider range of torque values than the known systems without involving such wide fluctuations in speed of the driven machine as do the known systems due to fluctuations in the load imposed by the driven machine when the hydraulic coupling is kept partly filled with a constant quantity of liquid. Nevertheless the speed of the driven machine can be readily varied in known manner by altering the degree of filling.

We claim:

A power transmission system of the kind in which a driving machine is coupled to a driven machine, which is required to run at various speeds relative to that of the driving machine and which imposes a load fluctuating independently of the speed, by a hydraulic coupling of the kinetic type which is provided with impeller and runner elements having substantially radial vanes and together forming a working circuit which has substantially the section of an oval disposed with its major axis radial and of which the inner profile diameter is between 30 and 40 per cent. of the outer profile diameter, said circuit containing annular core guide means around which the vortex circulation is adapted to take place, and the flow and return junctions of said circuit being disposed substantially in a common plane and having each a radial width of between 6 and 7.5 per cent. of said outer profile diameter, and means whereby, when the system is operating, the liquid content of said working circuit can be varied so as to alter the slip in the coupling and consequently the speed ratio of the two machines.

HAROLD SINCLAIR.
ROBERT GRIMSEY COOPER.